Figure 1:
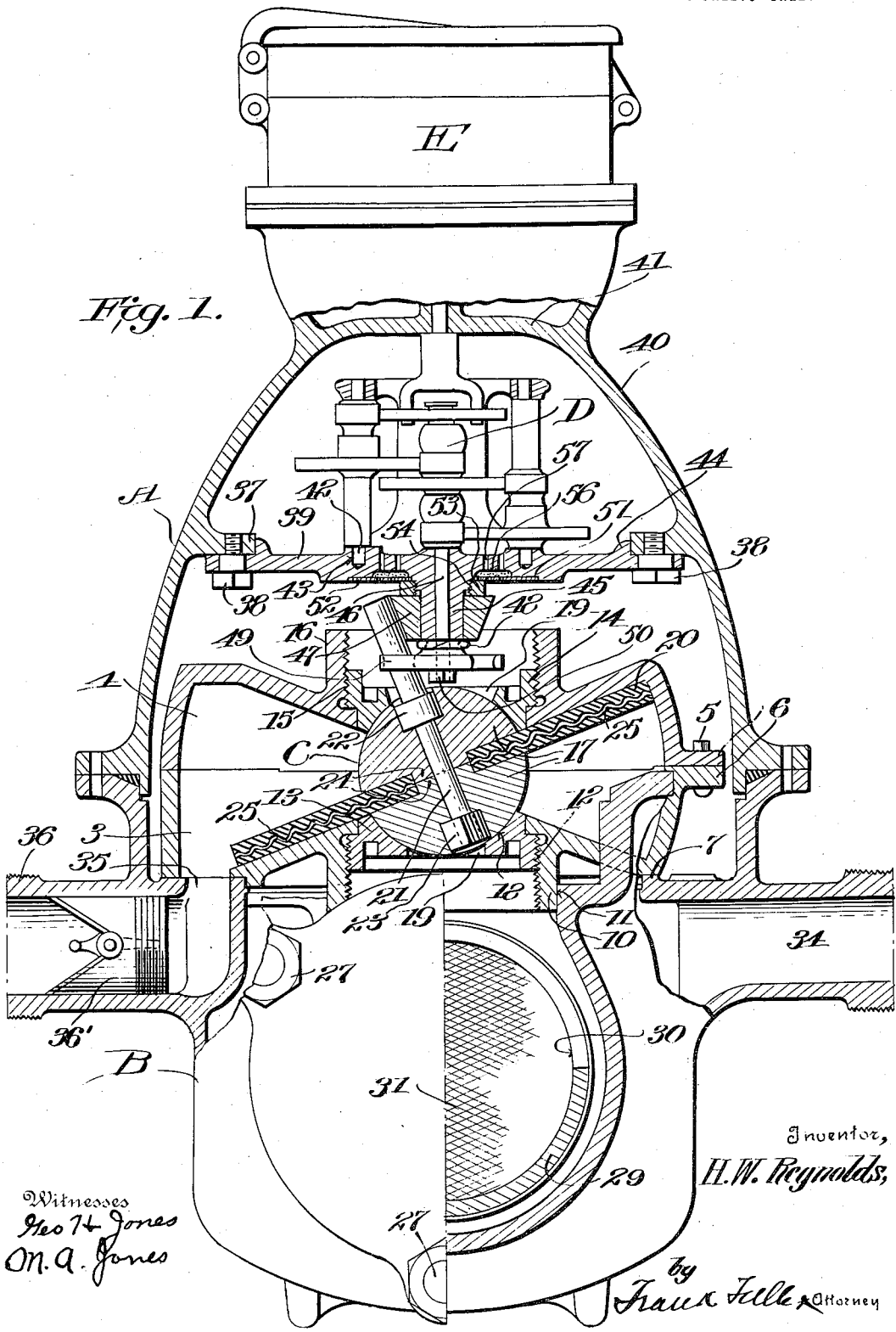

H. W. REYNOLDS.
WATER METER.
APPLICATION FILED NOV. 19, 1914.

1,179,759.

Patented Apr. 18, 1916.
3 SHEETS—SHEET 1.

Witnesses
Geo. H. Jones
M. A. Jones

Inventor,
H. W. Reynolds,
by Frank Fuller Attorney

H. W. REYNOLDS.
WATER METER.
APPLICATION FILED NOV. 19, 1914.
1,179,759.
Patented Apr. 18, 1916.
3 SHEETS—SHEET 2.
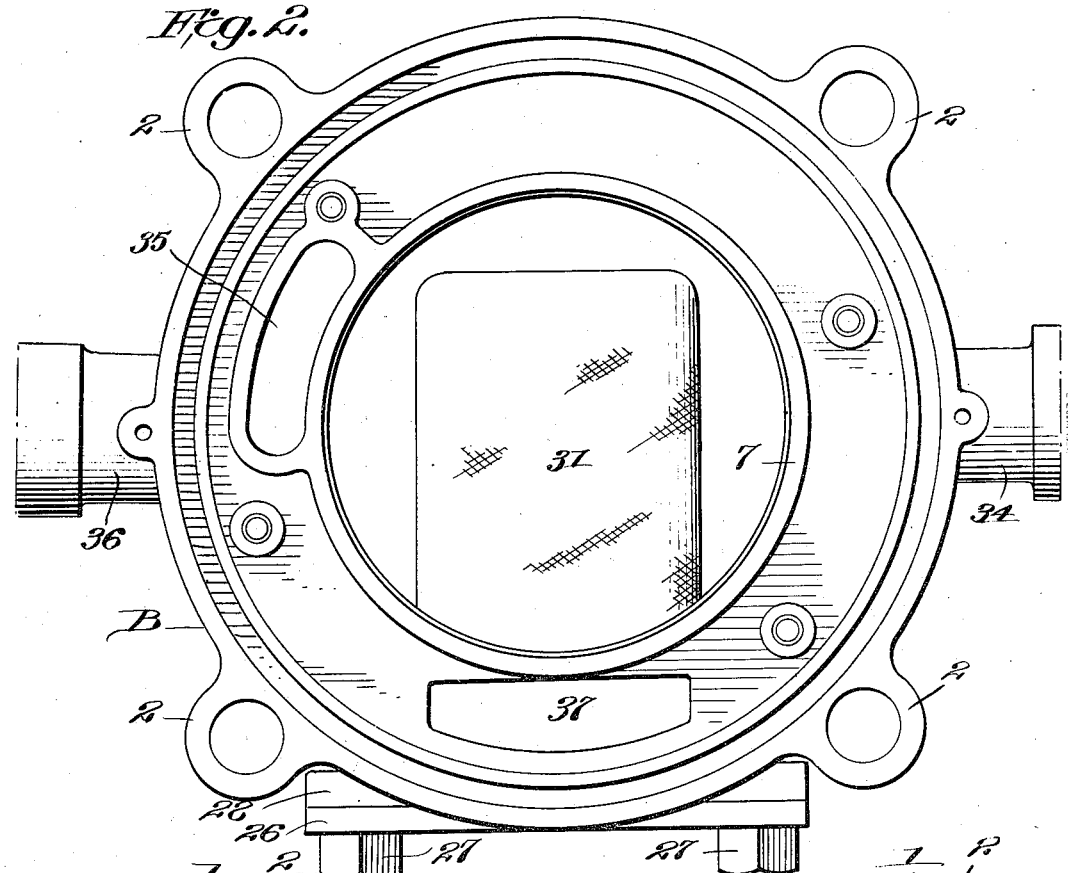
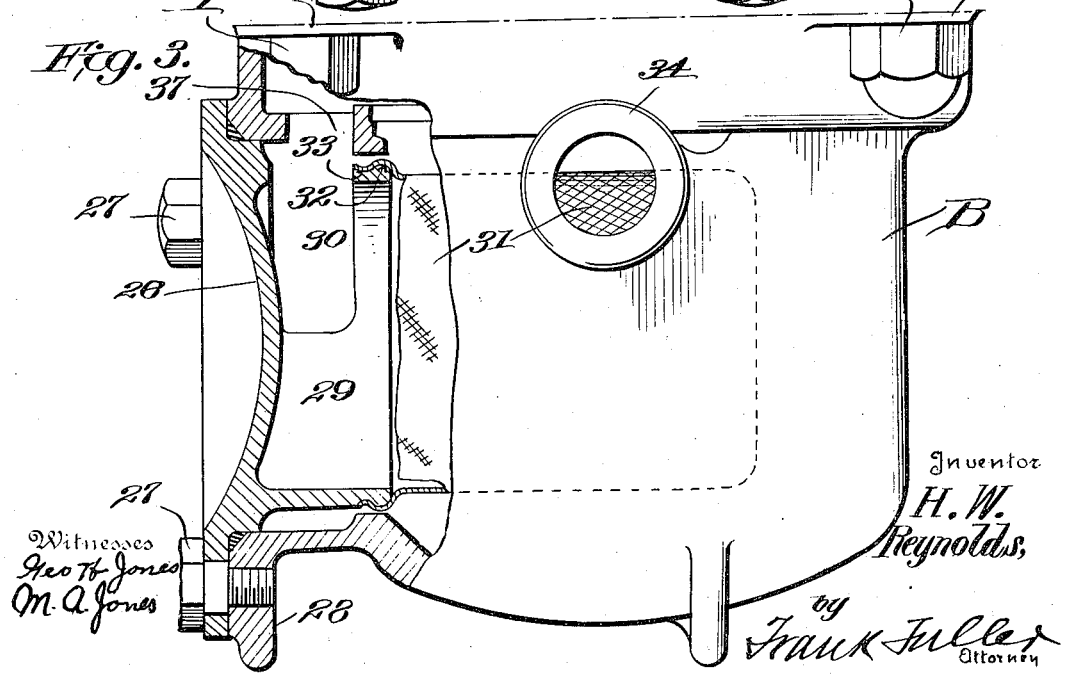
Inventor
H. W. Reynolds,
by
Frank Fuller
Attorney
Witnesses
Geo H. Jones
M. A. Jones H. W. REYNOLDS.
WATER METER.
APPLICATION FILED NOV. 19, 1914.
1,179,759.
Patented Apr. 18, 1916.
3 SHEETS—SHEET 3.
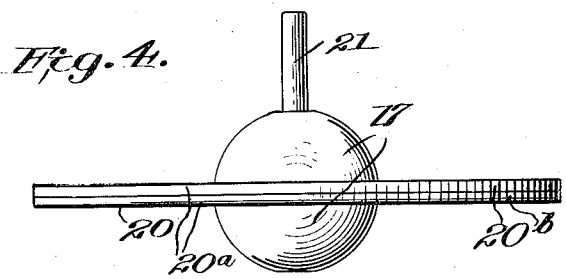
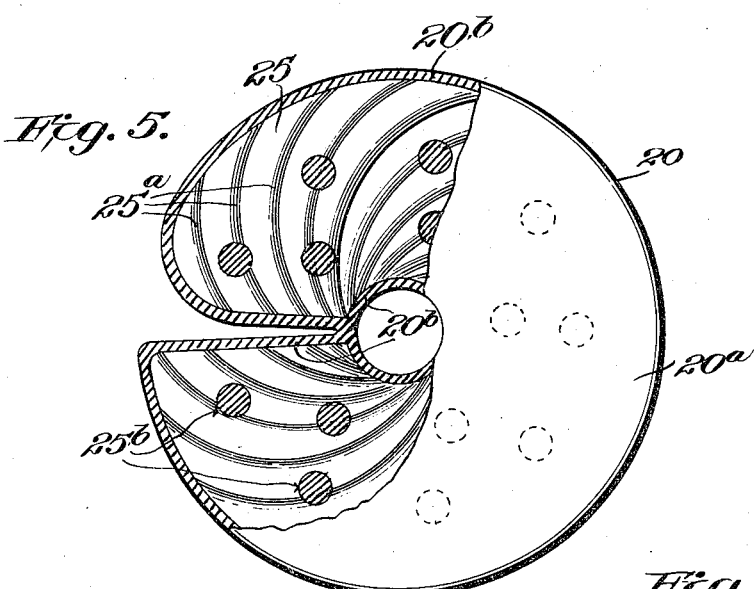
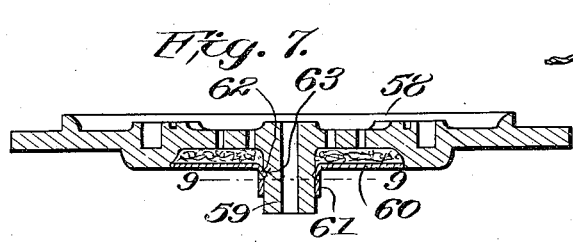
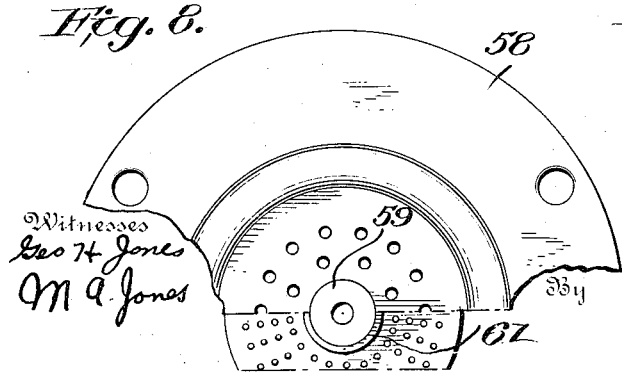
Inventor,
H. W. Reynolds,
Witnesses
Geo H Jones
M A Jones
By
Frank Fuller
Attorney.

UNITED STATES PATENT OFFICE.

HOWARD W. REYNOLDS, OF CHICAGO, ILLINOIS.

WATER-METER.

1,179,759.  Specification of Letters Patent.  Patented Apr. 18, 1916.

Application filed November 19, 1914. Serial No. 872,999.

*To all whom it may concern:*

Be it known that I, HOWARD W. REYNOLDS, a citizen of the United States, residing at Chicago, in the county of Cook and State of Illinois, have invented certain new and useful Improvements in Water-Meters, of which the following is a specification.

My invention relates to improvements in water meters and particularly to water meters of the disk piston type.

A main object of the invention is to provide means in a water meter which will serve as a fish trap and also as a trap for sand and sediment, and an object servient thereto is to provide a screen which can be readily removed for cleaning purposes.

Another object of the invention is to provide means whereby the disk piston is strengthened so as to minimize the chances of warping occasioned by the varying temperatures of the water passing through the meter.

Still another object is to provide the strengthening means for the disk-piston of a metallic plate having corrugations tending from the center of the disk but not radially thereof, so as to provide a construction wherein the valve is strengthened to a greater degree than would be the case if the valve were strengthened along radial lines.

A further object of the invention is to provide a means whereby the water passing to the gearing chamber may be filtered so as to serve as a lubricant for the various parts of the gearing.

With the foregoing as well as additional objects, such as will hereinafter appear, in view, the invention resides in certain details of construction, combinations and arrangements of parts as illustrated in accompanying drawings, wherein:

Figure 1 is a view showing my improved water meter partly in elevation, but partly in vertical section; Fig. 2 is a plan view of the lower section of the meter; Fig. 3 is a view of the lower section of the meter, partly in elevation and partly in section; Fig. 4 is a side elevation of the disk; Fig. 5 is a plan view of the disk; Fig. 6 is a section showing the strengthening corrugations of the disk in detail; Fig. 7 is a cross sectional view of a modified form of closure for the gearing chamber; Fig. 8 is a fragmentary view of the modified form of gearing chamber closure shown in Fig. 7, and Fig. 9 is a detail cross sectional view on an enlarged scale taken on the line 9—9 of Fig. 7.

Referring specifically to the drawings wherein like reference characters designate like or similar parts, the water meter chamber comprises an upper section A and a lower section B which are secured together by bolts 1 passing through apertures of flanges 2 on the sections A and B.

The disk piston is shown at C and is contained within a measuring chamber formed by sections 3 and 4, which sections are fastened together by bolts 5 passing through flanges 6 of the sections 3 and 4. Lower section B has an annular ledge 7 on which the section 3 rests. In addition, section 3 has a downwardly extending annular wall 10 which is mounted within an annular opening 11 formed in the section B. Wall 10 on its interior is provided with screw threads which are engaged at 12 by screw threads of a bearing or socket member 13.

A bearing or socket member 14 is mounted in the section 4 by the engagement of screw threads thereof at 15 with screw threads of an upwardly extending wall 16. The ball of the disk piston comprises sections 17 and in order to mount the sections 17, the bearings 13 and 14 are provided which have spherical seats at 18 to receive the ball. Openings 19 are provided through the bearings 13 and 14.

The piston proper comprises a disk like element 20 which is fastened to the sections 17 by means of the piston shaft 21. This shaft 21 has an enlargement 22 which is located within a recess of one section 17 and this shaft is also provided with screw threads on which rides a nut 23. This nut extends into a recess of the other section 17 and it serves as a means for fastening the sections 17 together so as to clamp the disk 20 therebetween. The central opening of the disk is enlarged with respect to the shaft 21 and into this opening extend abutting hubs 24 integral with the sections 17.

It is, as stated, a particular object of this invention to provide an effective means whereby the chances of the disk 20 warping when subjected to use in connection with water of varying temperatures are minimized. To this end, the disk has two similar casing sections 20ª preferably of hard rubber between which I embed a thin metallic disk-like reinforcing element 25.

As best seen in Fig. 6, this element is corrugated and the corrugations, or ribs which are designated 25ª, are widest at a point intermediate their ends, preferably the center and transversely of the element 25. The corrugations 25ª are curved or bent so that when in place in the disk, as seen in Fig. 5, they will not extend radially of the disk center. It will be noted, that a number of these elements crosses each radial line that may be drawn from the center of the disk. Thus at no portion of the disk can a radial line be drawn without crossing a plurality of the corrugations 25ª. Therefore, the disk is strengthened to a much greater degree than would be the case if strengthening elements extended radially from the disk center. There are no direct lines of flat surfaces through which bending or warping can effectively take place. If warping tends to take place, the corrugations combat it to such an extent as to make it practically impossible. In this construction of disk, the resistance varies at each point of the surface. The sections 20ª have ribs or flanges 20ᵇ at their inner and outer edges to protect the edges of disk 25. Openings 25ᵇ are provided in disk 25 and the sections 20ª are clenched therein.

Means is provided below the measuring chamber to filter the water which passes through the same. To accomplish this end, a plate 26 is removably fastened by set-screws 27 to a flange 28 of the lower section B. Extending inwardly and integral with the plate 26 is an annular extension or ring 29 which is preferably cut away above its center to provide a space 30 through which the water passes after entering the screen or trap means now to be described. A trap or basket 31 which may be made of any suitable material, for instance, screening so as to be foraminous is fastened to the ring 29 and has a portion which extends over a bead 32 on the ring 29 and beyond which bead, said portion is clenched into a groove 33 of the ring.

The water enters the chamber B through an inlet 34 and then flows around the trap 31 and then into the trap 31 through the cut away portion 30. As the water flows through the trap, all sand and sediment is screened therefrom and in addition fish which may flow in with the water are captured in the trap. At suitable times, the plate 26 may be detached from the section B after removing the set-screws 27. After removal of the plate 26, the same may be inverted so that the deposit within the trap 31 may be emptied through the cut-away portion 30. When the plate 26 and trap 31 are in place, the water after flowing through the trap flows into the water chamber 3—4 causing oscillation of the piston C and then flowing from the chamber 3—4 through a port 35 and then through outlet 36, in which is located a check valve 36¹. Above the cut-away portion 30 is provided a port 37 through which water may flow upwardly.

As is usual in water meters, the chamber, here comprising the sections A and B will, for the most part, be full of water at all times. In order that I may utilize the water as a lubricating medium, the following construction is provided. An annular flange integral with the section A extends interiorly thereof above the measuring chamber 3—4 at 37 and fastened thereto by means of set-screws 38 is a bearing plate 39. This plate 39 forms the bottom wall of a gearing chamber which is completed by a portion 40 of the outer wall of chamber A and by a wall 41 adjacent and interiorly of the top of chamber A. This plate 39 serves as a bearing for the gearing within the chamber which is shown at D inasmuch as shafts 42 of the gearing may have bearing in recesses 43 formed in the plate. A flange 44 is provided on the plate to extend within the flange 37 to assist in positioning the plate for fastening. Extending downwardly from and integral with the plate 39 is a hub 45. A shaft 46 of the gearing is mounted in a bore provided in the hub 45 and on the hub 45 is mounted a guide member 47. Below the guide member 47 a split spring ring 48 surrounds a recess in the hub 45 and serves to fasten the guide member thereon. A gearing-actuating element 49 is mounted on the shaft 46 below the ring 48 and is fastened to the shaft by means of a nut 50. The shaft 21 coöperates with the element 49 in order to actuate the gearing to in turn actuate the register in the uppermost portion E of the section A.

Above the guide member 47, and mounted on the hub 45, is a foraminous disk 51 which sets in a recess 52 of the plate 39. This disk 51 is tightly fastened in the recess by means of a nut 53 which rides on screw threads of the hub 45 at 54. A recess 56 is provided in plate 39 and therein is contained suitable filtering material, for instance, felt, wicking or other fabric, and communicating with the recess 56 are openings or ports 57, which ports also communicate with the interior of the gearing chamber. Water within the chamber A will flow through the foraminous disk 51, thence through the filtering medium, being thereby filtered, and the filtered water will then flow through the ports 57 into the gearing chamber where it acts as a lubricant for the various gearing elements. Undue wear of the gearing elements will be prevented inasmuch as the sediment or solid matter is filtered from the water by the means mentioned before entering the gearing chamber. The water cannot flow above the gearing chamber in view of the provision of wall 41.

A modification of the bearing disk 39 is shown in Figs. 7 and 8 where the disk is generally designated 58. Except for the fact that the hub of the disk 58 is modified, the construction of the disk is identical with the construction of disk 39. In this modified form, the hub is designated 59. The foraminous disk is designated 60 and has a collar 61 which surrounds the hub 59 and has inwardly extending spring lugs 62 which clip into recesses 63 provided on the periphery of hub 59. In attaching the foraminous disk 60 to the hub 59, the collar 61 is moved over the end of the hub, the lugs 62 springing outwardly until they reach the recesses 63 whereupon they spring inwardly into engagement with the recesses so as to be effectively fastened.

Inasmuch as only the preferred embodiment of the invention has been illustrated and described, it is to be understood that I may vary the details of construction without departing from the spirit and scope of the invention.

I claim:

1. A disk having reinforcing means embedded therein provided with reinforcing members each extending outwardly from the center of the disk toward the marginal edge and laterally with respect to a line extending radially of the disk and crossing a plurality of the members.

2. A disk having reinforcing means embedded therein, said means comprising a metallic element provided with corrugations extending outwardly from the center of the disk and laterally with respect to a line extending radially of the disk, said corrugations having their greatest width intermediate their ends.

3. A disk made of separate casing sections, a reinforcing member between the sections made separately therefrom, flange means on the sections to guard the reinforcing member, and said reinforcing member being provided with openings to permit clenching of the sections therein to connect the sections with the reinforcing member embedded therein.

4. A meter having a gearing chamber, a plate through which liquid may flow to said chamber, said plate having a recess, a removable filtering medium located within said recess, said recess communicating with the interior of said chamber and means carried by said plate to removably fasten said medium in said recess.

5. A meter having a gearing chamber, a plate through which liquid may flow to said chamber, said plate having a recess, a removable filtering medium located within said recess, said recess communicating with the interior of said chamber, a hub member extending from said plate, a fastening plate member for said filtering medium through which the hub member passes, one of said members being provided with a recess, and the other of said members being provided with a lug to engage in said recess.

6. A meter having a casing section and a plate forming a gearing chamber, said plate being removably fastened to the casing section, a hub on said plate, said plate being provided with a recess, filtering material located in said recess, said plate having openings leading from the recess to the interior of the gearing chamber, means through which said hub extends securing said material in said recess, and means engaging said hub, to fasten the first mentioned means in the position mentioned.

In testimony whereof I affix my signature in presence of two witnesses.

HOWARD W. REYNOLDS.

Witnesses:
 Wm. Sherman Carson,
 Edward F. Bendl.